US012558796B2

(12) United States Patent
Reichert

(10) Patent No.: US 12,558,796 B2
(45) Date of Patent: Feb. 24, 2026

(54) FORCE MEASUREMENT FILM, MOTION ROBOT HAVING FORCE MEASUREMENT FILM AND METHOD FOR CONTROLLING THE MOTION ROBOT USING THE FORCE MEASUREMENT FILM

(71) Applicant: Siemens Healthineers AG, Forchheim (DE)

(72) Inventor: Armin Reichert, Stein (DE)

(73) Assignee: Siemens Healthineers AG, Forchheim (DE)

( * ) Notice: Subject to any disclaimer, the term of this patent is extended or adjusted under 35 U.S.C. 154(b) by 215 days.

(21) Appl. No.: 18/332,193

(22) Filed: Jun. 9, 2023

(65) Prior Publication Data

US 2023/0398697 A1 Dec. 14, 2023

(30) Foreign Application Priority Data

Jun. 10, 2022 (DE) ..................... 10 2022 205 893.3

(51) Int. Cl.
B25J 13/08 (2006.01)
G01L 1/22 (2006.01)

(52) U.S. Cl.
CPC .............. B25J 13/085 (2013.01); G01L 1/22 (2013.01)

(58) Field of Classification Search
CPC ...... B25J 13/085; B25J 19/063; B25J 13/084; G01L 1/22; G01L 5/226

USPC .......................................................... 700/258
See application file for complete search history.

(56) References Cited

U.S. PATENT DOCUMENTS

| | | | |
|---|---|---|---|
| 2018/0061167 A1* | 3/2018 | Huang | G07D 7/181 |
| 2020/0209085 A1* | 7/2020 | Wettels | B25J 13/084 |
| 2022/0049997 A1 | 2/2022 | Katsuhara et al. | |
| 2022/0196492 A1 | 6/2022 | Burghoorn et al. | |
| 2022/0240811 A1* | 8/2022 | Ertelt | A61B 5/1038 |

FOREIGN PATENT DOCUMENTS

| | | |
|---|---|---|
| DE | 10341160 A1 | 3/2005 |
| DE | 112019006091 T5 | 9/2021 |
| EP | 3726191 A1 | 10/2020 |
| JP | 2018185273 A | 11/2018 |

* cited by examiner

*Primary Examiner* — B M M Hannan
(74) *Attorney, Agent, or Firm* — Harness, Dickey & Pierce, P.L.C.

(57) ABSTRACT

A flexible force measurement film is provided for detecting a contact force acting on the force measurement film, the force measurement film including a top tier to absorb the contact force; an attachment tier; and a sensor tier including an electrical resistance of the sensor tier that changes as a function of the contact force acting on the force measurement film, the sensor tier configured to provide at least one measurement signal based on the electrical resistance can be tapped.

20 Claims, 4 Drawing Sheets

FORCE MEASUREMENT FILM, MOTION ROBOT HAVING FORCE MEASUREMENT FILM AND METHOD FOR CONTROLLING THE MOTION ROBOT USING THE FORCE MEASUREMENT FILM

CROSS-REFERENCE TO RELATED APPLICATION(S)

The present application claims priority under 35 U.S.C. § 119 to German Patent Application No. 10 2022 205 893.3, filed Jun. 10, 2022, the entire contents of which are incorporated herein by reference.

FIELD

One or more example embodiments of the present invention relates to a force measurement film for detecting a contact force acting on the force measurement film. Furthermore, one or more example embodiments of the present invention relates to a motion robot having one or more force measurement film(s) such as a medical-engineering device having one or more force measurement film(s). Furthermore, one or more example embodiments of the present invention relates to a use of the force measurement film for controlling a motion of a motion robot or medical-engineering device. Furthermore, one or more example embodiments of the present invention relates to a computer-implemented method for controlling a motion of a motion robot or medical-engineering device having one or more force measurement film(s).

RELATED ART

Due to advancing automation it is not just in medical engineering that increasingly more motion sequences of devices having one or more moving element(s) are being automatically controlled. Such devices are called motion robots. For this, actuators, such as motors, servos, hydraulic facilities, etc., installed in the motion robot are actuated by appropriate control facilities in order to spatially move moving elements (motion elements for short) of these motion robots in a targeted manner.

In medical engineering motion robots can comprise, for example, medical-engineering devices such as imaging apparatuses, patient-supporting apparatuses or medical robots for examination and/or therapy of a patient (or be incorporated therein). Medical support, intervention or examination facilities can be brought into position by motion elements, such as automatically adjustable arms, fixtures, lifting elements, handling elements, etc. An examination facility can comprise, for example, a detector or an emitter or a medical imaging modality, such as an X-ray detector in a C-arm X-ray device. An intervention facility can comprise, for example, an apparatus for radiotherapy, such as an ion source.

One difficulty in automation lies in motion control of the motion elements. It thus has to be ensured that a motion is stopped if, for example, collisions occur inside the motion robot or with external objects. This is complicated in the case of interaction with human users or operators whose behavior cannot be predicted. For safety reasons motion elements are only allowed to touch users or operators with a maximum force, moreover, and it has to be guaranteed if all times that a motion is stopped immediately if an increased application of force points toward contact with a user.

A wide variety of sensors are conventionally fitted in such motion robots for this purpose. For example, such sensors can comprise force sensors in the housing bearing of the motion robots, torque sensors in pivot bearings of the motion robots, load sensors in the actuators of the motion robots or mechanical buttons and capacitive sensor faces in the or on the housing of the motion robots.

SUMMARY

Said and other sensors currently often cannot fulfil all demands that are made of them, however. Thus it is not possible to directly measure the acting forces in the case of sensors installed in device mechanics. Consequently, depending on contact point and levers, large forces can act on a user before a motion is stopped. Furthermore, many measurement systems are unsuitable, in particular for use in medical-engineering devices whose high electromagnetic fields can interfere with the sensors. In addition, said sensors are often cost-intensive.

One or more example embodiments of the present invention provide a motion robot, wherein improved measurement of a contact force is provided. Furthermore, one or more example embodiments provide an improved measurement facility for measuring a contact force in a motion robot. Furthermore, one or more example embodiments provide a method for controlling a motion robot using the measurement facility.

These and other objects are achieved by a motion robot, a method for controlling the motion robot, and a force measurement film for detecting a contact force. Advantageous developments are disclosed in the dependent claims.

BRIEF DESCRIPTION OF THE DRAWINGS

Further characteristics and advantages of invention will become evident from the explanations of exemplary embodiments below with reference to schematic drawings. Modifications mentioned in this connection can be combined with each other respectively in order to form new embodiments. Identical reference numerals are used for identical features in different Figures.

DETAILED DESCRIPTION

Figure 1:
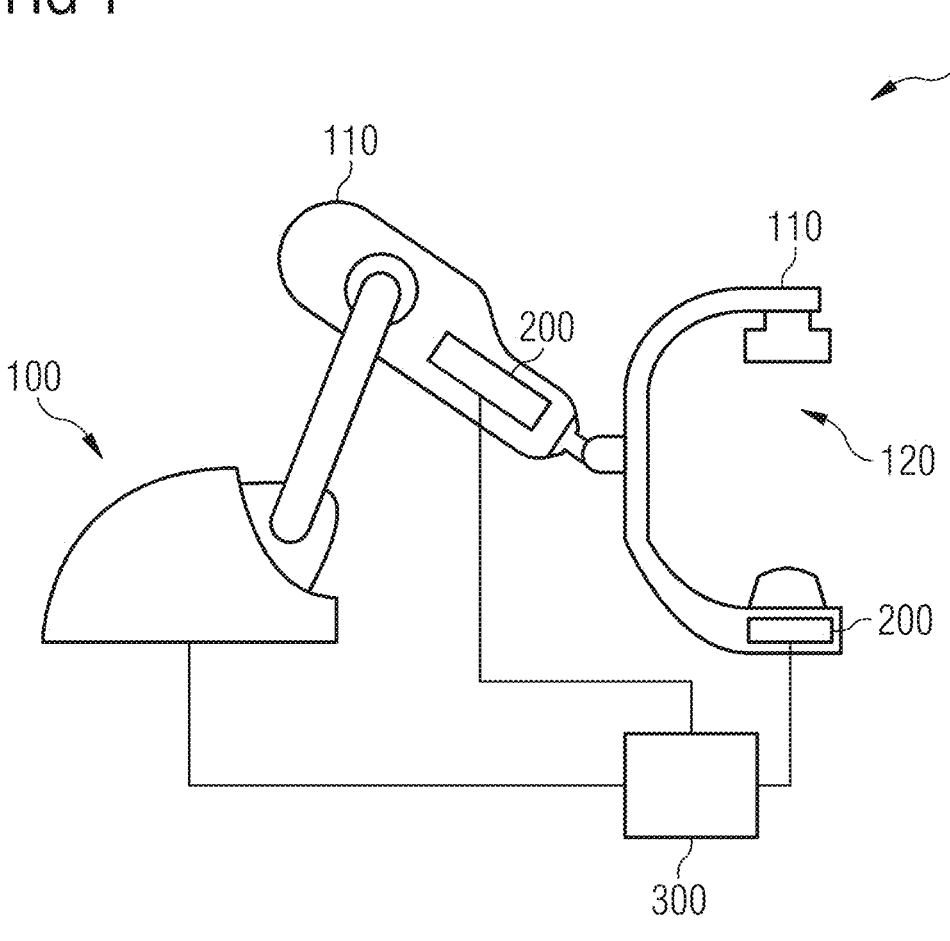
FIG. 1 shows a schematic representation of a system for imaging examination of a patient using a motion robot having one or more force measurement film(s).

According to at least one example embodiment, a motion robot is provided, which has at least one motion element and a force measurement film attached to a face of the motion element for detecting a contact force acting on the motion element. The force measurement film has: a top tier for absorbing the contact force, an attachment tier, with which the force measurement film is attached to the surface, and a sensor tier, which is embodied in such a way that an electrical resistance of the sensor tier changes as a function of the contact force (transferred from the top tier to the sensor tier) and at least one measurement signal based on the electrical resistance can be tapped.

The motion robot can have at least one functional element for performing an action. The motion robot can have one or more motion axes about which or along which a motion for positioning the functional element can take place. A motion of the motion robot can be freely programmable (that is to say, without mechanical or human intervention) with regard to a motion sequence comprising motion paths or motion angles for positioning the functional element. Furthermore, such a motion can be guided by sensors. The motion robot can have one or more actuator(s) for carrying out a motion. One or more of the actuator(s) can be embodied as an electric motor, servomotor and/or hydraulic actuator, etc. The motion robot can have one or more sensor(s) for controlling a motion. The motion robot can be used, in particular, universally.

The motion robot can have one or more motion element (s), which, due to a motion of the motion robot, for example in the course of a motion sequence, can be moved in the space. In particular, one or more actuator(s) of the motion robot can be provided per motion element for moving the motion element. The motion element can be a connecting element, which can be moved about an axis of the motion robot, such as an arm or rotary element. The motion element can also be an element, which can be moved, in particular retracted and extended, along an axis of the motion robot, such as a lifting or telescopic element. A functional element for performing an action can be attached to at least one of the motion elements. A motion sequence of a motion element can result, in particular, as function of a motion sequence of further motion elements of the motion robot.

A contact force can be taken to mean a mechanical load or force acting on a motion element or on a force measurement film attached to a face of the motion element. The contact force can be imparted, for example, by an object, which abuts the motion element or the force measurement film and exerts a mechanical force or load on the motion element or the force measurement film. The object can abut and exert a force due to proper motion of the object and/or a motion of the motion element in the motion robot. The object can be an external object outside of the motion robot. The object can be an internal object inside of the motion robot. The object can be, for example, a fixed or moving spatial obstacle for a motion sequence of the motion element. For example, the object can be a human user or operator of the motion robot.

The force measurement film is configured to detect a contact force acting on it, and therewith on the motion element located under the force measurement film. For this, the force measurement film has a sensor tier. The sensor tier is embodied in such a way that a contact force acting on the force measurement film can be detected by an electrical resistance that changes as a function of the acting contact force. In other words, the sensor tier can be referred to as a piezo-resistive force measurement element. Furthermore, the force measurement film can be referred to as a piezo-resistive force measurement film. In particular, the sensor tier can be arranged between the top tier and the cover tier.

In order to provide such piezo-resistive properties the sensor tier can have a piezo-resistive material or one or more piezo-resistive element(s), which singly or in combination provide a piezo-resistive property of the force measurement film.

Changeable "as a function of" or "in dependence on" the contact force can mean, in particular, that the force measurement film or the sensor tier provides at least two different electrical resistance values in the case of different force values of the acting contact force. In embodiments the electrical resistance of the force measurement film or the sensor tier can increase or decrease, at least in certain sections, as the contact force increases. In particular, the electrical resistance of the force measurement film or the sensor tier can increase or decrease, at least in certain sections, proportional to an increasing contact force. Furthermore, the sensor tier can be embodied in such a way that a threshold value with regard to the acting contact force has to be overcome, above which value the electrical resistance of the force measurement film or the sensor tier changes.

The electrical resistance of the force measurement film or the sensor tier is detected via one or more measured value(s), which can be tapped from the force measurement film or the sensor tier. The measured values can be, for example, electrical currents. To enable tapping of the measured values the force measurement film or the sensor tier can have one or more electrical port(s), which can be part of an interface of the force measurement film or can be connected to such.

The force measurement film, and therewith the tiers contained therein, can be flexible at least in certain sections. Flexible can mean, in particular, that the force measurement film and the tiers contained therein can bend, to a certain degree, in one or more direction(s) without incurring damage.

For example, the force measurement film can have a thickness of 50 µm up to 10 cm. The force measurement film preferably has a thickness of 1 mm to 20 mm.

The top tier can generally designate the outwardly directed, that is to say, away from the motion element or the attachment tier, surface or tier of the force measurement film. The top tier can be part of the sensor tier or be embodied separately from it. The top tier can be embodied to protect the force measurement film and, in particular, the sensor tier from environmental influences and/or to make the force measurement film distinguishable by way of back-printing or printing. The top tier can be embodied, for example, from a plastics material or comprise such a material. In particular, the top tier can be embodied from a polymer material or comprise such a material.

The attachment tier can generally designate a surface or tier of the force measurement film with which the force measurement film can be attached to a face. The attachment tier can be embodied for attaching the force measurement film to a face. That is to say, the attachment tier can be embodied to provide a contact face or attachment face to this face. The attachment tier can be part of the sensor tier or be embodied separately from it. The attachment tier can have one or more attachment element(s) for attaching the force measurement film to a face. For example, these attachment elements can comprise recesses in which corresponding protruding fastening elements of the face can engage, or the attachment elements can comprise protruding fastening elements, which can engage in corresponding recesses in the face. In particular, the attachment tier can have, at least sections, an adhesive material for gluing the force measurement film to the face. The attachment tier can be embodied, for example, from a plastics material or comprise such a material. In particular, the attachment tier can be embodied from a polymer material or comprise such a material.

Providing a motion robot with piezo-resistive force measurement film provides a system having an inexpensive, easy-to-assemble force-measuring component for controlling the motion robot which can be flexibly adapted to the motion robot. In particular, the configuration as a film with the described tier structure allows flexible attachment to motion elements of the motion robot. An inexpensive contact force-measuring section can be achieved by way of the piezo-resistive properties. In addition, a piezo-resistive measurement is less susceptible to faults than other measuring principles since piezo-resistive properties are influenced to a lesser degree by high electro-magnetic fields, which often exist in the environment of motion robots, than other measuring methods.

According to at least one example embodiment, the motion robot is embodied as a medical-engineering device and has a medical intervention and/or examination facility, which is (directly or indirectly) attached to the motion element and can be spatially moved by moving the motion element.

The medical intervention and/or examination facility can be embodied as a functional element of the motion robot. In particular, the medical-engineering device can have an imaging modality. For example, the medical intervention and/or examination facility can comprise a functional element for medical imaging, such as an X-ray emitter, an X-ray detector, an ultrasound head, a (movable) patient couch, a magnetic resonance tunnel, etc. Furthermore, the medical intervention and/or examination facility can comprise a component for carrying out a therapeutic procedure on a patient, such as a surgical robot for carrying out a, in particular minimally invasive, procedure on the patient, a radiation source, etc.

According to at least one example embodiment, the motion robot also has a control facility, which is embodied to control a motion of the motion element on the basis of the at least one measurement signal, and, in particular, to stop a motion of the motion element if the measurement signal or a contact force based on it overshoots a threshold value.

The control facility can have a data link to the force measurement film for receiving the measurement signals. The control facility can be embodied to provide one or more control command(s), based on the measurement signals, which are suitable for controlling the motion element on the basis of the measurement signals. The control facility can have a data link to one or more actuator(s) of the motion robot in order to provide the control commands for controlling the motion element. The control facility can be embodied to determine, on the basis of the measurement signal(s), a contact force acting on the force measurement film or the motion element. The control facility can also be embodied to compare the measurement signal(s) or the determined contact force with a predetermined threshold value.

The computing facility can have, for example, one or more processor(s). The computing facility can comprise a computing unit or comprise part of a computing unit of the motion robot.

According to at least one example embodiment, the force measurement film has an interface for establishing a data link (for example to the computing facility) or for transmitting the measurement signals, the interface being embodied, in particular, as a wireless interface.

The measurement signals can be transmitted by way of the interface. Due to the configuration as a wireless interface the force measurement film can be easily tethered to control facilities or the like without, for example, impeding the motion robot or user by way of cable runs.

The wireless interface can be embodied, for example, as a WLAN, Bluetooth or ZigBee interface. As an alternative to a wireless or cable-free interface, the interface can also be embodied as a tethered interface (for example as a USB interface) and/or have both cable-free and tethered channels.

According to at least one example embodiment, the force measurement film also comprises a power supply apparatus for operating the force measurement film.

The power supply apparatus can have a current-carrying line with which a tethered power supply of the force measurement film can be ensured. The power can be supplied via the interface.

Alternatively or in addition, the power supply apparatus can have a battery, in particular in the form of an accumulator. The latter has the advantage that the force measurement film can be freely positioned in the space without having to take supply lines into consideration. For charging the accumulator the power supply apparatus can also have a battery interface via which the accumulator can be charged.

According to at least one example embodiment, the control facility is also embodied to carry out a functional check of the force measurement film.

The functional check can ensure that the force measurement film is working correctly and is supplying reliable measured values for control of the motion robot.

According to at least one example embodiment, the sensor tier comprises a first and a second sensor layer. The first sensor layer is embodied in such a way that an electrical resistance of the first sensor layer changes as a function of the contact force acting on the force measurement film (or the top tier), and a first component of the measurement signal can be tapped by the first sensor layer, which first component is based on the electrical resistance of the first sensor layer. The second sensor layer runs substantially parallel to the first sensor layer and is embodied in such a way that the electrical resistance of the second sensor layer changes as a function of the contact force acting on the force measurement film (or the top tier) a second component of the measurement signal can be tapped by the second sensor layer, which second component is based on the electrical resistance of the second sensor layer.

In particular, the first component of the measurement signal is independent of the second component of the measurement signal, and vice versa. In particular, the first sensor layer is electrically isolated from the second sensor layer.

In other words, a two-layer sensor tier is provided in which the first and the second sensor layers are arranged one above the other.

The two-layer design of the sensor tier means the contact force can be detected on two-channels (with the first and second components of the measurement signal). On the one hand this creates redundancy if one sensor layer should fail. Furthermore, the two channels can be reciprocally verified, and this can improve the detection reliability and accuracy of the detection.

According to at least one example embodiment, the control facility is embodied to control a motion of the motion element on the basis of the two components of the measurement signal, and, in particular, to stop a motion of the motion element if at least one of the components of the measurement signal overshoots a threshold value.

Even more reliable control and, in particular, interruption of an ongoing motion can take place by taking into account the two channels in the control facility.

According to at least one example embodiment, the sensor tier has a conductive tier, and a measurement tier. The measurement tier has a measurement electrode array for detecting the measurement signal, and the measurement electrode array is, if there is no contact force on the force measurement film (or the top tier), spaced apart from the conductive tier (the sensor tier is embodied in such a way that the measurement electrode array, if there is no contact force acting on the force measurement film or the top tier, is spaced apart from the conductive tier).

Furthermore, the sensor tier can be embodied in such a way that the measurement electrode array comes into contact with the conductive tier if a contact force is acting on the force measurement film (or the top tier). In particular, the sensor tier can be embodied in such a way that the measurement electrode array comes into contact with the conductive tier if a contact force is acting on the force measurement film (or the top tier), which is greater than a contact force threshold value (predefined by the sensor tier).

According to embodiments of the invention, the first and or the second sensor layer can have one measurement tier and conductive tier respectively, which can be configured as described herein.

In other words, the conductive tier and the measurement tier act together to the extent that they provide a sensor element whose electrical resistance changes as a function of the contact force acting on the force measurement film. If, namely, the measurement electrode array makes contact with the conductive tier, the electrical resistance of the conductive tier changes. The implementation represents a simple, inexpensive and simultaneously robust manner of creating a piezo-resistive measuring element. The optional contacting only above a contact force threshold value can ensure that only significant contact forces are detected whereby an exaggerated sensitivity of the force measurement film can be avoided.

According to at least one example embodiment, the sensor tier has a spacing tier arranged between the conductive tier and the measurement tier and which is embodied in such a way that the spacing tier, if there is no contact force acting on the sensor tier, produces a spacing between the conductive tier and the measurement tier, and the spacing tier, in the case of a contact force acting on the sensor tier, permits contact between conductive tier and measurement tier.

In particular, the spacing tier can be embodied in such a way that the spacing tier, above the overshooting of a contact force threshold value of the contact force acting on the sensor tier (predefined by the spacing tier), permits contact between conductive tier and measurement tier. In particular, the spacing tier can be embodied in such a way that, with an increasing contact force acting on the sensor tier, the spacing tier permits increasing contact (for example by way of an increasingly large contact face) between conductive tier and measurement tier.

For example, the spacing tier can be embodied at least partially from an at least partially elastic material. For example, the spacing tier can be embodied from a plastics material or can have such a material. For example, the spacing tier can have an adhesive material on both sides to produce a bond between the conductive tier and the measurement tier. For example, the spacing tier can have one or more recess(es)/passage(s) to enable contact between conductive tier and measurement tier.

According to at least one example embodiment, the measurement electrode array has a first electrode structure and a second electrode structure, with the second electrode structure being electrically isolated from the first electrode structure.

The sensor tier can be embodied in such a way that the measurement electrode array comes into contact with the conductive tier, if a contact force is acting on the sensor element, in such a way that an electrical connection is established between the first and the second electrode structures via the conductive tier. In particular, the sensor tier can be embodied in such a way that the measurement electrode array comes into contact with the conductive tier, if a contact force is acting on the sensor element which is greater than a contact force threshold value (predefined by the sensor tier), in such a way that an electrical connection is established between the first and the second electrode structures via the conductive tier. Furthermore, the sensor tier can be embodied in such a way that the measurement electrode array comes into contact with the conductive tier, if a contact force is acting on the sensor element, in such a way that an electrical connection established between the first and the second electrode structures via the conductive tier is all the more electrically conductive the greater the contact force acting on the sensor element is.

The first and/or the second electrode structure(s) can be embodied to be ridge- or grid-like respectively. In particular, the first and the second electrode structures can be embodied to be ridge-like, with the ridge elements (teeth) of the first and the second electrode structures reciprocally meshing.

The first electrode structure and the second electrode structure can run in or on the measurement tier.

The use of two electrode structures that are isolated from each other makes it possible to create a simple and robust array whose resistance decreases due to bridging via the conductive tier as the contact force increases.

According to at least one example embodiment, the measurement electrode array has a conductor loop. In particular, both the first electrode structure and the second electrode structure have a conductor loop. In particular, the conductor loop runs (the conductor loops run) in a plurality of conductive loops in or on the measurement tier. In particular, the conductive loops can run in a meandering manner in or on the measurement tier. In particular, the conductor loop of the second electrode structure can run, at least in certain sections, parallel to the conductor loop of the first electrode structure.

Effects of the measurement tier making contact with the conductive tier on the current flow can be detected by the respective conductive loops. The electrical resistance in the sensor tier, for example due to the current flow between the conductor loop of the first electrode structure and the conductor loop of the second electrode structure, can be ascertained in the process. This makes reliable detection of the electrical resistance, and thus of the contact force, possible. In addition, when conductive loops are used the measurement electrode array, and therewith the sensor tier, can be functionally checked by way of a flow-through test of the respective conductor loops. If a conductor loop is interrupted in this regard, no current flows through the conductor loop, and this indicates a fault in the array.

According to at least one example embodiment, the measurement tier has a second measurement electrode array different from the measurement electrode array for detecting a further component of the measurement signal. In particular, the second measurement electrode array can be embodied in or on the measurement tier separately from the measurement electrode array or be electrically isolated from the measurement electrode array.

The use of a second measurement electrode array makes two-channel measurement of the measurement signal possible. On the one hand this creates redundancy should one measurement electrode array fail. Furthermore, on the other hand, the two channels can be reciprocally verified and this can improve the detection reliability and accuracy of the detection.

The second measurement electrode array can have a form and a shape as described in conjunction with the measurement electrode array. In particular, the second measurement electrode array can have the same form and shape as the measurement electrode array.

With a two-layer embodiment the second measurement electrode array can be arranged in the second sensor layer while the measurement electrode array is arranged in the first sensor layer.

According to at least one example embodiment, conduction elements of the measurement electrode array run, at least in certain sections, orthogonal to conduction elements of the second measurement electrode array (in a plan view of the force measurement film).

For example, with a ridge-like embodiment of the measurement electrode array(s) the teeth of the measurement electrode array run, in plan view of the force measurement film, orthogonal to the teeth of the second measurement electrode array. Similarly, with a conductor loop embodiment individual conducting path portions of the two measurement electrode arrays can run orthogonal to each other in plan view.

According to at least one example embodiment, the conductive tier has a conductive polymer tier, which is embodied, in particular, as a semiconductor.

According to one example, the conductive tier has a graphite-containing semi-conductive polymer tier.

The use of a conductive polymer tier makes it possible to provide the conductive tier inexpensively and with large degrees of freedom in arrangement and embodiment. In addition, such a conductive tier is flexible and can facilitate the attachment of the force measurement film on curved faces.

According to at least one example embodiment, the conductive tier is embodied in such a way that an electrical resistance of the conductive tier changes as a function of the contact force acting on the conductive tier.

In other words, the conductive tier can therewith be taken to mean a measuring element, which indicates a change in the contact force due to a changing (internal) resistance of the conductive tier. This makes accurate measurement of the contact force possible. While with a conductive tier having constant electrical resistance the total resistance of the array results "only" due to increased or reduced contact between measurement tier and conductive tier as a consequence of a change in contact force, with a conductive tier having changeable resistance a further contribution, and thus good signal resolution, is obtained.

According to one embodiment, an electrical resistance of the conductive tier changing as a function of the contact force acting on the conductive tier can be achieved, for example, in that the conductive tier has an at least partially compressible matrix in which conductive particles are embedded. With a load due to a contact force the conductive particles can then increasingly come into contact with each other and reduce the electrical resistance of the conductive tier.

According to at least one example embodiment, the conductive tier has a flexible film on which the conductive polymer tier is imprinted. In particular, the flexible film can be embodied from a plastics material or have such a material.

The use of a film as a carrier of the conductive polymer tier makes it possible to achieve a stable and simultaneously flexible design of the conductive tier. Imprinting of the conductive polymer tier represents an efficient and accurate manner of defining a conductive tier. In other words, the conductive polymer tier can be conceived as an "ink" for providing a piezo-resistive element.

According to at least one example embodiment, the measurement tier has a flexible substrate on which the measurement electrode array and possibly the second measurement electrode array are imprinted. In particular, the flexible substrate can be embodied from a flexible film, in particular a flexible plastics material film or have such a film.

In other words, the measurement tier can comprise a printed circuit, and this makes an inexpensive and flexible design of the measurement tier possible.

According to embodiments of the invention, the first and/or the second sensor layer(s) can have one measurement tier, conductive tier and/or spacing tier respectively as described herein.

According to at least one example embodiment, the sensor tier has a flexible film and the first and the second sensor layers, with the first sensor layer and the second sensor layer having one conductive tier respectively, the conductive tier of the first sensor layer having a conductive polymer tier, which is printed onto a first side of the flexible film, and the conductive tier of the second sensor layer having a conductive polymer tier, which is printed onto a second side of the flexible film, which second side opposes the first.

In other words, the two sensor layers "share" the supporting film for the conductive tier, and this makes a simpler and less expensive construction of a two-layer sensor tier possible.

According to at least one example embodiment, the sensor tier has at least two sensor fields, which cover different regions of the face respectively and at which independent measurement signals respectively can be tapped, which are based on the contact force acting on the respective sensor field.

In other words, the sensor fields are respectively embodied in such a way that an electrical resistance of the respective sensor field changes as a function of the contact force acting on the respective sensor field and at least one measurement signal based on the electrical resistance can be tapped by the sensor field. In particular, the sensor fields are embodied independently of each other respectively. In particular, the sensor fields have at least one separate output respectively for tapping at least one measurement signal (for instance, in the form of more or more electrical port(s)).

According to at least one example embodiment, the control facility is embodied to control a motion of the motion element on the basis of the at least two independent measurement signals, and, in particular, to stop a motion of the motion element if at least one of the independent measurement signals overshoots a threshold value.

The use of a plurality of independent sensor fields makes a spatially resolved, and therewith more accurate, detection of the contact force possible. Furthermore, fail-safety is increased and the force measurement film is more flexible.

According to at least one example embodiment, the top tier has an at least partially transparent protective film, the protective film being back-printed, or a substantially non-transparent decorative film is arranged on the inner side of the protective film.

A transparent top tier makes it possible to combine a protective effect with an option for shaping the force measurement film for the user. The protective film can have, for example, a plastics material film or be embodied from such a film.

According to at least one example embodiment, the top tier has an at least partially compressible crumpled tier, which has, in particular, a foam.

In particular, the crumpled tier can be 0.5 cm to 5 cm thick. In particular, the crumpled tier can be 1 cm to 3 cm thick. In particular, the crumpled tier can be 2 cm thick.

The crumpled tier makes it possible on the one hand to attenuate the effects of contact of the motion element with an obstruction. In particular, a human user can thus be protected. On the other hand, the force measurement film can be better attached to three-dimensional faces since unevennesses in the attachment can be outwardly concealed by the crumpled tier.

According to at least one example embodiment, the control facility is also embodied to carry out a functional check of the force measurement tier. In particular, control facility is embodied to carry out a functional check of a measurement electrode array. In particular, the control facility is embodied to carry out a functional check of a measurement electrode array during the course of a current flow-through test on the measurement electrode array.

The functional check can ensure that the force measurement film is working correctly and is supplying reliable measured values for control of the motion robot.

According to at least one example embodiment, a computer-implemented method for controlling a motion robot is provided. The method comprises the following steps:

tapping a measurement signal from the resistive force measurement film for detecting a contact force acting on the motion element;

controlling the motion element on the basis of the measurement signal.

The advantages of the method can be found in analogy to the advantages of the concrete embodiments described herein. The method can be carried out completely or partially by the control facility described herein. The method can be developed, in particular, by features described in conjunction with the mode of operation of the control facility.

In particular, the method can have a step of carrying out of a functional check of the force measurement film or measurement electrode array, it being possible for the functional check of the measurement electrode array to be carried out, in particular, during the course of a current flow-through test on the measurement electrode array.

According to a further aspect, a computer program product is provided, which comprises a program and can be directly loaded into a memory of a programmable controller (control facility) and has program means, for example libraries and help functions, in order to carry out a method H control of a motion robot, in particular according to the embodiments/aspects described herein when the computer program product is executed.

According to a further aspect, a computer-readable storage medium is provided on which readable and executable program segments are stored in order to carry out all steps of a method for controlling a motion robot according to the embodiments/aspects described herein when the program segments are executed by the controller (control facility).

The computer program products can comprise software having a source code, which still has to be compiled and linked or which only has to be interpreted, or an executable software code, which for execution merely still has to be loaded in the processing unit. The method can be carried out quickly, in an identically repeatable manner and robustly by the computer program products. The computer program products are configured such that they can carry out the inventive method steps via the computing unit. The computing unit has to have the requirements, such as an appropriate RAM, an appropriate processor, an appropriate graphics card or an appropriate logic unit, so the respective method steps can be efficiently carried out. The computer program products are stored, for example, on a computer-readable storage medium or saved on a network or server from where they can be loaded into the processor of the respective computing unit, which can be directly connected to the computing unit or can be embodied as part of the computing unit. Furthermore, control information of the computer program products can be stored on a computer-readable storage medium. The control information of the computer-readable storage medium can be embodied in such a way that it carries out an inventive method when the data carrier is used in a computing unit. Examples of computer-readable storage medium are a DVD, a magnetic tape or a USB stick on which electronically readable control information, in particular software, is stored. All inventive embodiments/aspects of the previously described methods can be carried out when this control information is read from the data carrier and stored in a computing unit. One or more example embodiments of the present invention can thus also start from said computer-readable medium and/or said computer-readable storage medium. The advantages of the proposed computer program products or the associated computer-readable media substantially correspond to the advantages of the proposed method.

According to at least one example embodiment, a flexible force measurement film is provided for detecting a contact force acting on the force measurement film, with the force measurement film having a flexible top tier for absorbing the contact force, a flexible attachment tier, with which the force measurement film can be attached to a face, and a flexible sensor tier, which is embodied in such a way that an electrical resistance of the sensor tier changes as a function of the contact force acting on the force measurement film (or the contact force transferred from the top tier to the sensor tier) and at least one measurement signal based on of the electrical resistance can be tapped.

The advantages of the force measurement film can be found in analogy to the advantages of the embodiments of the motion robot described herein. The force measurement film can be developed, in particular, by features described in conjunction with the motion robot. Conversely the motion robot can be developed by features described in conjunction with the force measurement film.

According to at least one example embodiment, the force measurement film has at least one incision, which runs from an edge of the force measurement film. In other words, the force measurement film is cut-in at one location at least from an edge of the force measurement film.

According to at least one example embodiment, the force measurement film extends in a first direction and is cut-in along a second direction, different from the first, from at least one edge of the force measurement film.

The direction of extension can be, for example, that direction of the force measurement film in which the force measurement film has the greatest linear extension. In particular, the force measurement film can have a certain bending flexibility in the direction of extension.

The incisions make it possible for the force measurement film to have improved bending flexibility, at least in certain sections, in particular in the direction of the incision, since only a section has to be deformed and not the entire force measurement film in order to follow, for example a bulge in a face to which the force measurement film is to be attached. The force measurement film can consequently be attached more easily to multiply curved faces.

According to at least one example embodiment, the force measurement film has at least two sensor fields, which cover different regions of the face respectively, and at which independent measurement signals respectively can be tapped, which are proportional to the contact force acting on the respective sensor field. In particular, in the region of the sensor fields the force measurement film can have top tier, attachment tier and sensor tier, while in the regions outside of the sensor fields it has only top tier and attachment tier.

In particular, the sensor fields can have one separate sensor tier respectively. In particular, the sensor fields can have one conductive tier and one measurement tier respectively as described herein. In particular, the sensor fields can have one spacing tier respectively as described herein. In particular, the sensor fields can have first and second sensor layers respectively as described herein.

Division into sensor fields can guarantee improved flexibility and adjustability of the force measurement film to a face to which the force measurement film is to be attached.

In particular, the at least two sensor fields can be arranged one behind the other in the direction of extension. This can further facilitate the ability of the force measurement film to adjust to a face curved in the direction of extension.

In particular, the force measurement film can have a higher bending stiffness, and thus lower flexibility, in regions of the sensor fields than in regions without sensor fields. Increased flexibility in regions without sensor fields means the force measurement film can be better adjusted to an attachment face. In particular, in regions without sensor fields the force measurement film can have a lower elasticity against pulling than in regions with sensor fields. For this, top tier and attachment tier can have, for example, a lower modulus of elasticity than the sensor tier (whose modulus of elasticity is given, for example, by the measurement electrode array). The force measurement film attachment face can consequently be "lifted", whereby the force measurement film can be better adjusted to the attachment face.

According to at least one example embodiment, a force measurement film is provided, which in a region between two sensor fields is cut-in from an edge of the force measurement film.

The ability of the force measurement film to adjust to, in particular, multiply curved attachment faces can be further facilitated by the combination of incisions and sensor fields since, for example, sensor fields which are adjacent but separated by incisions can assume different radii and directions of curvature.

FIG. 1 represents a medical-engineering device 100 for carrying out an imaging examination of a patient or an interventional procedure on a patient. The medical-engineering device 100 has a medical functional element 130 for carrying out an imaging examination of a patient or a therapeutic and/or interventional procedure on a patient and a motion facility 120 for, in particular, at least partially automatic moving of the functional element 130. The motion facility 120 has at least one motion element 110, which can be moved in the space about at least one axis. In particular, the motion element 110 can be moved motorically or hydraulically. The medical-engineering device 100 can thereby be embodied as a motion robot 100.

In the example shown the functional element 130 is embodied as an X-ray examination modality having an X-ray emitter and a corresponding detector in C-arm configuration. Other embodiments are likewise possible. For example, the functional element 130 can comprise an irradiation modality for carrying out an irradiation therapy or an intervention apparatus for carrying out an interventional procedure on the patient. The medical-engineering device 100 can also have further apparatuses (not shown), such as a patient couch or further facilities, which can likewise be moved by the motion facility 120.

On at least one motion element 110 the medical-engineering device 100 has at least one force measurement film 200. In the example shown there are two force measurement films 200, which are arranged on different motion elements 110 respectively. The force measurement films 200 can be attached to corresponding faces of the respective motion elements 110—for example in that the force measurement films 200 are glued to corresponding faces of the motion elements 110.

The force measurement films 200 are basically embodied to detect a contact force acting on them—and therewith on the motion element 110—and to provide corresponding measurement signals MSa, MSb. The measurement signals MSa, MSb can then be supplied to a control facility 300 of the medical-engineering devices 100, which is embodied to control the medical-engineering device 100 and, in particular, the motion facility 120 on the basis of the measurement signals MSa, MSb.

Figure 2:
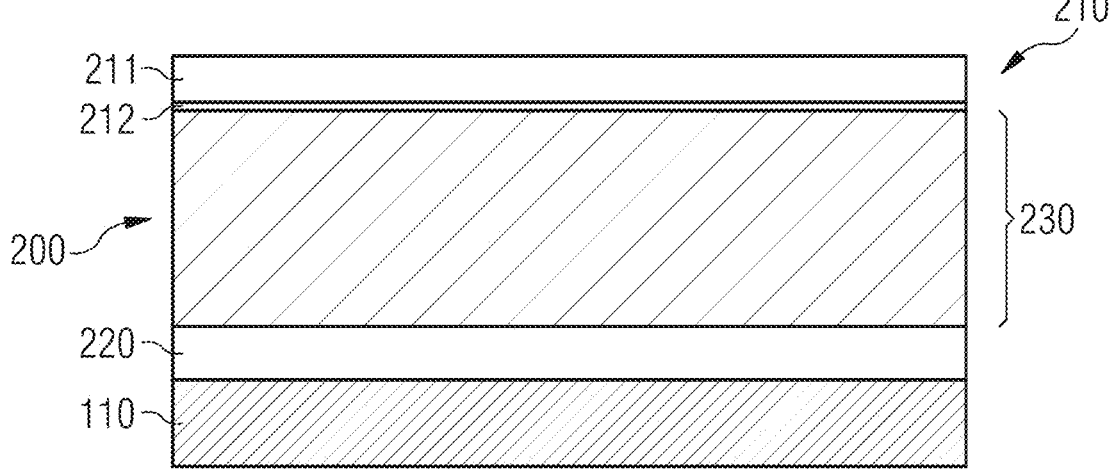
FIG. 2 shows a force measurement film attached to a face according to one embodiment in a sectional view from the side.

Different implementations are conceivable for the force measurement film 200. FIG. 2 shows one embodiment of a flexible force measurement film 200 in a lateral sectional view.

The force measurement film 200 has a top tier 210, a sensor tier 230 and an attachment tier 220. The top tier 210 outwardly delimits the force measurement film 200. The sensor tier 230 is embodied for detecting a contact force KF acting on the force measurement film 200. The attachment tier 220 serves to attach the force measurement film 200 to a face, such as an outer face of a motion element 110.

The attachment tier 220 can have, for example, an adhesive tier with which the force measurement film 200 can be glued to a face. In other words, the force measurement film 200 can therefore be embodied as a self-adhesive force measurement film 200. The individual tiers, 210, 220, 230 of the force measurement film 200 are preferably at least partially flexible, whereby the force measurement film 200 can be adjusted to a bent contour of the face.

The top tier 210 outwardly terminates the force measurement film 200 and protects, in particular, the sensor tier 230 located below. The top tier 210 can have, for example, a protective tier or film 211. The protective tier 211 can be embodied as a plastics material or polymer tier. Furthermore, the top tier 210 can be at least partially transparent. Furthermore, the top tier can be back-printed, that is to say, have an imprint 212 on the back or on the side facing the sensor tier 230, which imprint is visible from outside through the partially transparent top tier 210. Alternatively, the top tier 210 can have an imprinted film 212 on the side facing the sensor film 230. As a further alternative the top tier 210 can be imprinted on the outer side. For example, the protective tier 211 can be imprinted.

Furthermore, the protective tier 211 can be embodied as crumpled tier in order to absorb some of a contact force KF acting on the force measurement film 200, and therewith on the motion element 110. For example, the crumpled tier can be embodied to be at least partially compressible. For example, the crumpled tier can be embodied as a foam tier.

The sensor tier 230 can be embodied as a resistive sensor element. In other words, the sensor tier 230 can be embodied as piezo-resistive sensor element. In other words, the sensor tier 230 can be embodied in such a way that an electrical resistance of the sensor tier 230 changes as a function of a contact force acting on the force measurement film 200 KF. The electrical resistance of the sensor tier 230 can change, for example, proportionally to the acting contact force KF. In particular, the electrical resistance of the sensor tier 230 can increase or decrease as the contact force KF increases. Furthermore, the sensor tier 230 can be embodied in such a way that firstly, a force threshold has to be overcome (that is to say, a minimum contact force KF has to act on the force measurement film 200) for an electrical resistance of the sensor tier 230 to change.

In particular, the sensor tier 230 can be embodied in such a way that one or more measurement signal(s) MSa, MSb can be tapped by the sensor tier 230, which measurement signals MSa, MSb are based on the electrical resistance of the sensor tier 230 and are, in particular, proportional to it. In addition, the sensor tier 230 can be embodied in such a way that one or more control measurement signal(s) MC1, MC2 can be tapped by the sensor tier 230, which enable a functional check of the sensor tier 230. For this, the sensor tier 230 can have, for example, one or more port(s), which are connected to an electronic evaluation device. The electronic evaluation device can be integrated in the control facility 300. The contact force KF acting on the force measurement film 200 can consequently be detected with the measurement signals MSa, MSb. The electronic evaluation device (the control facility 300) can be embodied to determine the contact force KF acting on the force measurement film 200 on the basis of the measurement signals MSa, MSb.

Figure 3:
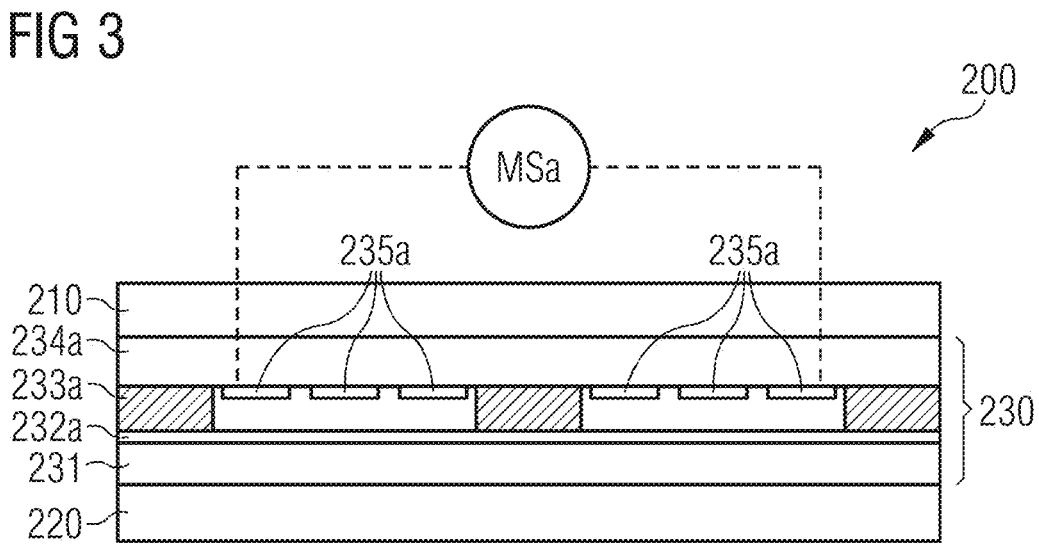
FIG. 3 shows a force measurement film according to a further embodiment in a sectional view from the side.

FIG. 3 shows one possible implementation of the piezo-resistive properties of the sensor tier 230. An electrical resistance of the sensor tier 230, which can change as a function of the acting contact force KF, is implemented by cooperation between a conductive tier 232a and a measurement electrode array 235a spaced apart from it in the force-free state. The measurement electrode array 235a is arranged on a measurement tier 234a. For example, the measurement electrode array 235a and the measurement tier 234a can be embodied as a printed circuit on a flexible substrate such as a plastics material film.

The spacing between the measurement electrode array 235a and the conductive tier 234a can be guaranteed, for example, by a spacer 233a, which is arranged between the conductive tier 232a and the measurement tier 234a. The spacer 233a can be, for example, at least partially compressible and be adhesively embodied on both sides for producing a bond with the measurement tier 234a and the conductive tier 232a. As FIG. 3 shows, the spacer 233a has openings so the conductive tier 232a can come into contact with the measurement electrode array 235a when a contact force KF is acting. For example, the spacer can have a plurality of objects (for example spheres or cylinders) made of elastic material, which are arranged between the measurement tier 234a and the conductive tier 232a.

The conductive tier 232a can have, for example, a conductive polymer tier. The polymer tier can be printed, for example, onto a flexible supporting film 231. The polymer tier can be provided as a conductive ink for this purpose. The conductive polymer tier can be embodied as a semiconductor. For example, the polymer tier can have a polymer-matrix in which electrically conductive particles are embedded. In particular, the conductive tier 232a can be embodied in such a way that an electrical resistance of the conductive tier 232a changes as a function of the pressure acting on it due to the contact force KF.

Figure 4:
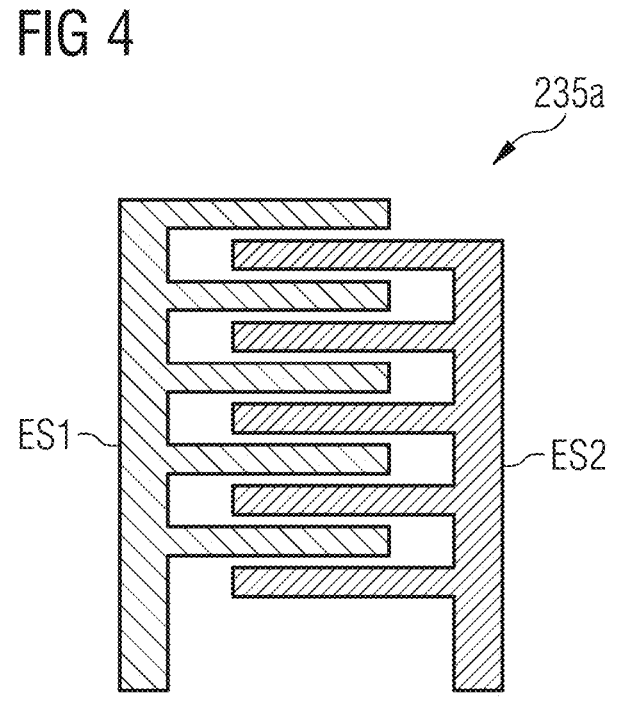
FIG. 4 shows a measurement electrode array according to an embodiment in a plan view.

FIG. 4 shows an exemplary measurement electrode array 235a in a plan view of the force measurement film 200. The measurement electrode array 235a can have, for example, a first electrode structure ES1 and a second electrode structure ES2, which are separated or isolated from each other. The first and the second electrode structures ES1, ES2 can be embodied to be ridge- or grid-like respectively. The first and the second electrode structures ES1, ES2 can have one external port respectively. The resistance between the first and the second electrode structures ES1, ES2 can be measured by the measurement of a current as a measurement signal MSa.

If no contact force KF is acting on the force measurement film 200, the conductive tier 232a does not touch the measurement electrode array 235a. The first and the second electrode structures ES1, ES2 are isolated from each other thereby and no current flows between the two of them. The resistance between the first and second electrode structures ES1, ES2 is therewith very high (in the region of MS)) and there is practically no flow of current as a measurement signal MSa between the first and second electrode structures ES1, ES2.

If a contact force KF is applied to the force measurement film 200, above a certain force threshold the measurement electrode array 235a touches the conductive tier 232a and a current can flow between the first and the second electrode structures ES1, ES2 via the conductive tier 232a and the resistance tapped at the measurement electrode array 235a drops.

With an electrically conductive tier 235a whose electrical resistance changes as a function of the contact force KF, the change in resistance of the conductive tier 232a can be ascertained with the measured current, moreover. If, for example, the resistance of the conductive tier 232a drops as the contact force KF increases, the flow of current as a measurement signal MSa consequently increases.

As a further effect the measurement electrode array 235a is pressed more strongly onto the conductive tier 232a as the contact force KF increases. Consequently more elements of the first and second electrode structures ES1, ES2 are joined together. The resistance drops and the flow of current as a measurement signal MSa increases as a result.

Figure 5:
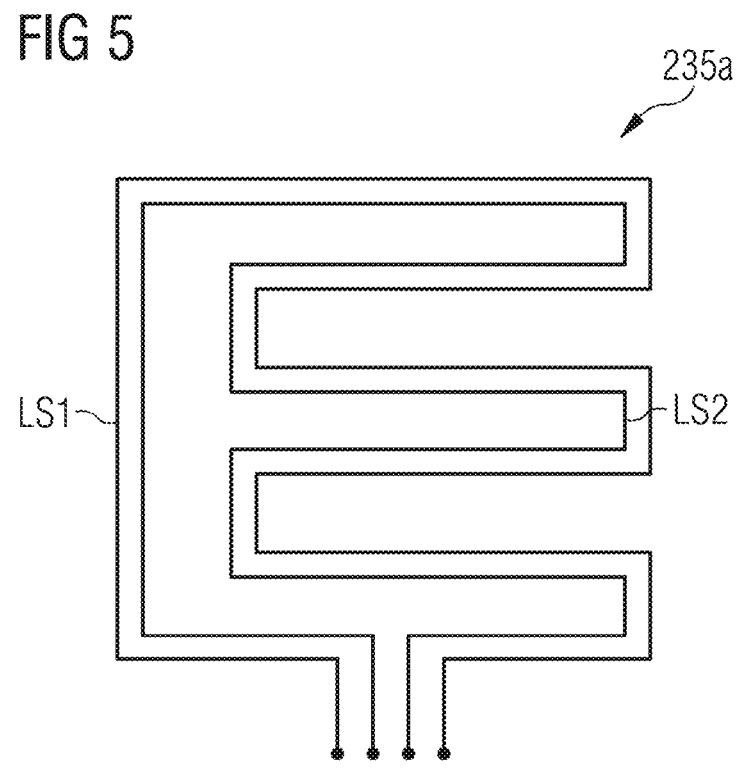
FIG. 5 shows a measurement electrode array according to a further embodiment in a plan view.
Figure 6:
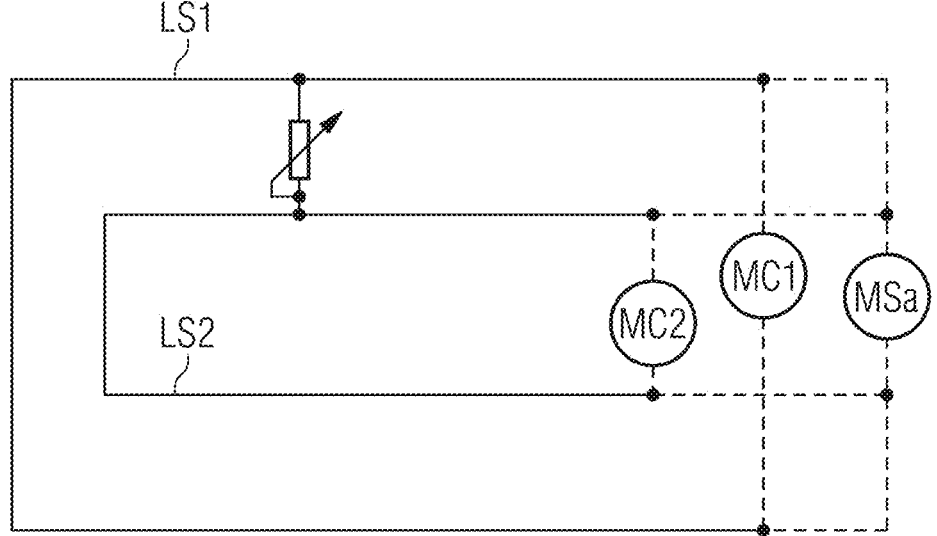
FIG. 6 shows an equivalent circuit diagram of a measurement electrode array according to one embodiment.

FIG. 5 shows a plan view of a further embodiment of a measurement electrode array 235a. FIG. 6 represents an associated equivalent circuit diagram. In this embodiment the measurement electrode array 235a has two conductor loops LS1 and LS2, which run on or in the measurement tier 234a in a plurality of loops respectively. The conductor loops LS1 and LS2 form one current circuit respectively in the measurement tier 234a whose current can be measured via corresponding ports. The second conductor loop LS2 is isolated from the conductor loop LS1 independently and at least without action of a contact force KF by the conductor loop LS1. The conductive loops of the second conductor loop LS2 preferably run, at least in certain sections, parallel to the conductive loops of the conductor loop LS1.

As represented in FIG. 6, on the one hand, the array allows a measurement of the flow of current between the two conductor loops LS1, LS2 as a measurement signal MSa proportional to the electrical resistance. The principle of the change in the electrical resistance as a function of the contact force KF corresponds to the principle discussed in conjunction with FIG. 4. Above a certain contact force KF the first and the second conductor loops LS1, LS2 are short-circuited by each other by way of the conductive tier 232_a_. A flow of current between the two conductor loops LS1, LS2 occurs, which can be measured as a measurement signal MSa. Similarly, the further change in resistance (of the conductive tier 232_a_ or entire array) can be detected by way of the flow of current as a measurement signal MSa.

On the other hand, the let-through current through the respective conductor loops LS1, LS2 themselves can be measured in the case of the conductor loops LS1, LS2 respectively. With the associated measurement signals MC1 and MC2 it is possible to check whether the conductor loops LS1, LS2 are intact or are, for example, broken at one location. In other words, the sensor tier 230 can thus be functionally checked.

The arrangements of the measurement electrode arrays 235_a_ represented in FIGS. 4 and 5 should be understood as being merely exemplary. Any further changes in the design of the measurement electrode arrays 235_a_ are conceivable. For example, the conductor loops of the conductor paths LS1, LS2 can run in different ways. Similarly the ridges can be arranged in different ways.

Figure 7:
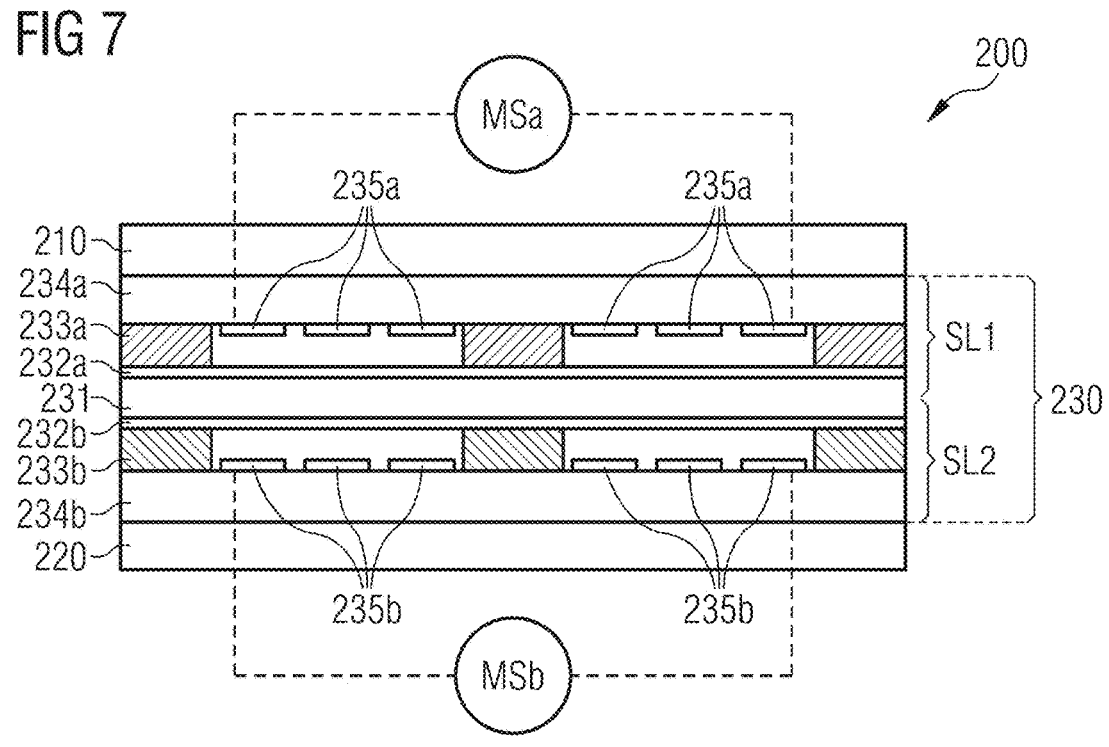
FIG. 7 shows a force measurement film according to a further embodiment in a sectional view from the side.

FIG. 7 shows a further possible implementation of the piezo-resistive properties of the sensor tier 230. The embodiment shown has two sensor layers SL1 and SL2. Both sensor layers SL1 and SL2 are embodied to change an electrical resistance as a function of the acting contact force KF. Both sensor layers LS1, LS2 are also embodied respectively to provide a measurement signal MSa, MSb, which is based on the electrical resistance of the respective sensor layer SL1, SL2.

In particular, the measurement signals MSa, MSb are independent of each other, enabling a two-channel measurement with two independent channels.

The first sensor layer SL1 is constructed like the sensor tier 230 shown in FIG. 3. In other words, an electrical resistance of the first sensor layer SL1 which can change as a function of the acting contact force KF is implemented by cooperation between a conductive tier 232_a_ and a measurement electrode array 235_a_ spaced apart from it in the force-free state. The measurement electrode array 235_a_ is arranged on a measurement tier 234_a_. The spacing between the measurement electrode array 235_a_ and the conductive tier 234_a_ is guaranteed by a spacer 233_a_, which is arranged between the conductive tier 232_a_ and the measurement tier 234_a_. The measurement electrode array 235_a_ or the measurement tier 234_a_ and the conductive tier 232_a_ and the spacer 233_a_ can be embodied as stated in conjunction with FIGS. 3 to 6.

The second sensor layer SL2 is in principle also constructed like the embodiment of the sensor tier 230 shown in FIG. 3. In other words, an electrical resistance of the second sensor layer SL2 which can change as a function of the acting contact force is implemented by cooperation between a conductive tier 232_b_ and a (second) measurement electrode array 235_b_ spaced apart from it in the force-free state. The measurement electrode array 235_b_ is arranged on a measurement tier 234_b_. The spacing between the measurement electrode array 235_b_ and the conductive tier 234_b_ is guaranteed by a spacer 233_b_, which is arranged between the conductive tier 232_b_ and the measurement tier 234_b_. The measurement electrode array 235_b_ or the measurement tier 234_a_ and the conductive tier 232_b_ and the spacer 233_b_ can be embodied as stated in conjunction with FIGS. 3 to 6.

In the embodiment shown in FIG. 7 the tier arrangement of the second sensor layer SL2 is mirrored to the tier arrangement of the first sensor layer SL1. As a result it is possible that the first conductive tier 232_a_ and the second conductive tier 232_b_ share the same flexible supporting film 231. In particular, the flexible supporting film can be imprinted with the polymer tier on both sides.

Figure 8:
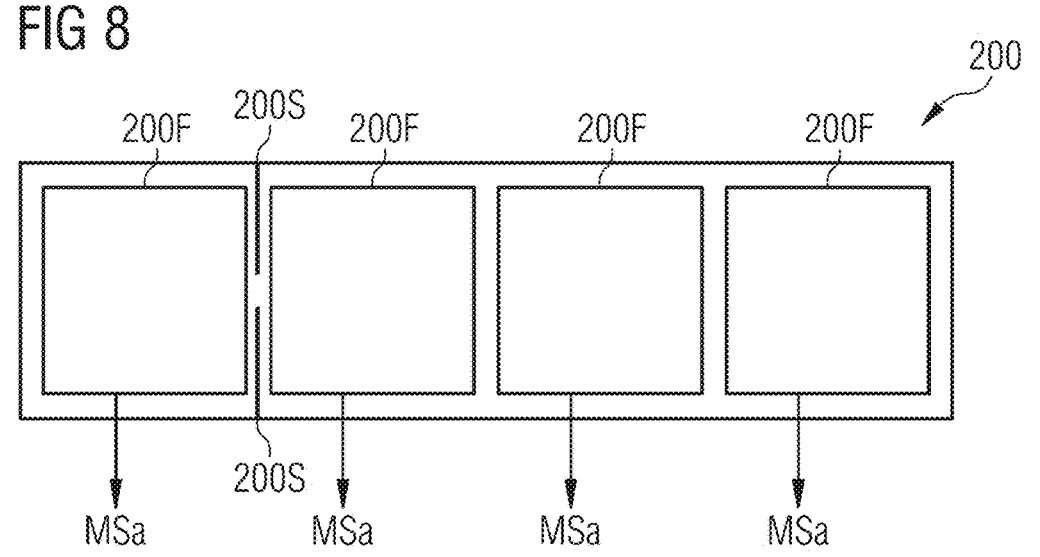
FIG. 8 shows a force measurement film according to one embodiment in a plan view.

FIG. 8 shows a force measurement film 200 in a plan view according to one embodiment. In the embodiment shown the force measurement film 200 has a plurality of sensor fields 200F. The sensor fields 200F cover different regions of the face of the force measurement film 200. The sensor fields 200F represent mutually independent piezo-resistive measurement ranges of the force measurement film 200. The sensor fields 200F are respectively embodied in such a way that they have an electrical resistance, which changes as a function of the contact force KF acting on the respective sensor field 200F. The sensor fields 200F are respectively embodied to provide at least one measurement signal MSa, which is based on an electrical resistance of the respective sensor field 200F. The measurement signals MSa provided by different sensor fields 200F are mutually independent respectively.

The individual sensor fields 200F can be constructed as stated in conjunction with FIGS. 3 to 7. In particular, the sensor fields 200F can have one (independent) sensor tier 230 respectively. The sensor tiers 230 of the sensor fields 200F can be constructed as stated in conjunction with FIGS. 3 to 7. In particular, the sensor fields 200F can have one or two sensor layers SL1, SL2 respectively. In particular, the sensor fields 200F can have at least one independent (that is to say, not electrically connected to conductive tiers of other sensor fields 200F) conductive tier 232_a_, 232_b_ respectively. The top tier 210 and the attachment tier 220 can extend across the sensor fields 200F in one piece.

On the one hand, the different sensor fields 200F enable spatially resolved detection of the contact force KF acting on the force measurement film 200. On the other hand, better flexibility and therewith ability of the force measurement film 200 to adjust to a face characteristic of the motion element 110 to which the force measurement film 200 is to be attached can be achieved by the plurality of individual sensor fields 200F. In particular, an adjustment of the force measurement film 200 to a bent contour of a face in a first direction can be facilitated by the sensor fields 200F.

To further improve the flexibility, and therewith the adjustability of the force measurement film 200, the force measurement film 200 can be cut-in from its edges at one or more location(s). In the example shown the force measurement film 200 is provided with two incisions 200S at opposing edges. An adjustment of the force measurement film to a bent contour of a face in a second direction, which is different from the first direction, can be facilitated as a result.

In the example shown a plurality of sensor fields 200F is arranged in a row in a first direction of extension R of the force measurement film 200 and thus enables good adjustment to a curved contour of a face, which is curved the along the direction of extension. Furthermore, the force measurement film 200 shown by way of example has two incisions 200S perpendicular to the direction of extension R, emanating from the edges of the force measurement film 200. The incisions 200S run between two sensor fields 200F. A good adjustment of the force measurement film 200 to a curved contour of a face, which is curved perpendicular to the direction of extension, along the incisions therefore, is possible as result. As a result the force measurement film 200 can be attached crease-free to a face curved twice in this way.

The number and arrangement of incisions 200S shown should be understood as being merely exemplary and can of course be varied depending on the face to which the force measurement film 200 is to be attached.

Figure 9:
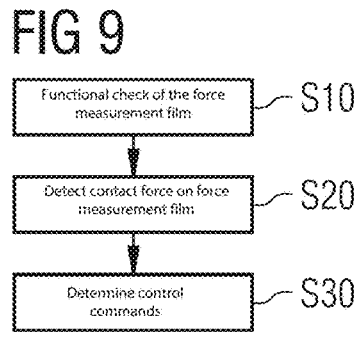
FIG. 9 shows a method for controlling a motion robot according to one embodiment.

FIG. 9 shows an exemplary embodiment of a computer-implemented method for controlling a medical-engineering device 100. The order of the method steps is limited neither by the represented sequence nor by the selected numbering. The order of the steps can thus possibly be interchanged and individual steps can be omitted. In addition, one or more step(s), in particular a sequence of steps, and optionally the entire method can be carried out repeatedly. The steps are preferably carried out by an appropriately embodied control facility 300.

A functional check of the force measurement film 200 is carried out in a first (optional) step S10. Each sensor layer SL1, SL2 or each sensor field 200F can be checked individually for functional capability. For example, the measurement electrode arrays 235a, 235b can be checked for whether there is a malfunction. In particular, this can take place with a flow-through test with which it may be possible to identify whether the measurement electrode arrays 235a, 235b are interrupted.

One or more measurement signal(s) MSa, MSb can be tapped in step S20 at the force measurement film 300 and be supplied to the control facility 300. The measurement signals MSa, MSb are based, as mentioned, on corresponding electrical resistance of the force measurement film 200, which can change as a function of the contact forces KF acting on the force measurement film 200. In other words, a contact force KF acting on the force measurement film 200, and therewith on the motion element 110, is detected in step S20.

Control commands are determined in step S30 on the basis of the measurement signals MSa, MSb, with which commands the medical-engineering device 100 and, in particular, the motion element 110 can be actuated. In particular, it can be determined in step S30 whether the detected contact force KF or one or more measured value(s) MSa, MSb overshoot a predetermined threshold value (identifying a stop condition). If this is the case, the motion of the motion element 110 can be caused to stop in step S30 by corresponding control commands to the medical-engineering device 100. Furthermore, the control commands can be suitable, after identifying the stop condition, for reversing the motion element 110 by a predetermined amount of motion in order to cancel again thereby at least partially a motion executed up to identification of the stop condition.

Different measured values MSa, MSb or different channels of the measured values MSa, MSb can be taken into account individually or cumulatively in step S30. The stop condition can thus be considered to be identified, for example, as soon as a measured value MSa, MSb or a channel of a measured value MSa, MSb lies above the predetermined threshold value.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In this application, the term 'module', 'unit' or the term 'controller' may be replaced with the term 'circuit.' These terms may refer to, be part of, or include processor hardware (shared, dedicated, or group) that executes code and memory hardware (shared, dedicated, or group) that stores code executed by the processor hardware.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although the invention has been illustrated and described in greater detail by one or more example embodiments, the invention is not restricted by the disclosed examples and other variations can be derived herefrom by the person skilled in the art, without departing from the scope of protection of the invention.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Where it has not yet explicitly occurred but [is] expedient and within the meaning of the invention, individual exemplary embodiments, individual partial aspects or features thereof can be combined with each other or interchanged without departing from the scope of the present invention. Advantages of the invention described with reference to one exemplary embodiment also apply without being explicitly mentioned, where transferable, to other exemplary embodiments.

The invention claimed is:

1. A motion robot having:
at least one motion element; and
a force measurement film attached to a face of the motion element, the force measurement film configured to detect a contact force acting on the motion element, wherein the force measurement film includes,
a top tier to absorb the contact force,
an attachment tier attached to the face of the motion element, and
a sensor tier, the sensor tier including an electrical resistance that changes as a function of the contact force acting on the force measurement film, the sensor tier configured to provide at least one measurement signal based on the electrical resistance.

2. The motion robot of claim 1, further comprising:
a control facility configured to,
control a motion of the motion element based on the at least one measurement signal.

3. The motion robot of claim 2, wherein
the control facility is configured to carry out a functional check of the force measurement film.

4. The motion robot of claim 3, wherein the sensor tier comprises:
a first sensor layer, the first sensor layer including,
an electrical resistance that changes as a function of the contact force detected by the force measurement film, a first component of the at least one measurement signal being based on the electrical resistance of the first sensor layer, and
a second sensor layer extending substantially parallel to the first sensor layer, the second sensor layer including,
an electrical resistance that changes as a function of the contact force detected by the force measurement film, a second component of the at least one measurement signal being based on the electrical resistance of the second sensor layer.

5. The motion robot of claim 4, wherein the sensor tier includes:
a conductive tier, and
a measurement tier having a measurement electrode array for detecting the at least one measurement signal, wherein
the measurement electrode array is spaced apart from the conductive tier when no contact force is acting on the sensor tier.

6. The motion robot of claim 1, wherein the sensor tier comprises:
a first sensor layer, the first sensor layer including:
an electrical resistance that changes as a function of the contact force detected by the force measurement film, a first component of the at least one measurement signal being based on the electrical resistance of the first sensor layer, and
a second sensor layer extending substantially parallel to the first sensor layer, the second sensor layer including:
an electrical resistance that changes as a function of the contact force detected by the force measurement film, a second component of the at least one measurement signal being based on the electrical resistance of the second sensor layer.

7. The motion robot of claim 1, wherein the sensor tier includes:
a conductive tier, and
a measurement tier having a measurement electrode array for detecting the at least one measurement signal, wherein
the measurement electrode array is spaced apart from the conductive tier when no contact force is acting on the sensor tier.

8. The motion robot of claim 7, wherein
the conductive tier has a conductive polymer tier.

9. The motion robot of claim 8, wherein
the conductive tier is embodied in such a way that an electrical resistance of the conductive tier changes as a function of the contact force acting on the conductive tier.

10. The motion robot of claim 9, wherein
the sensor tier includes at least two sensor fields, the at least two sensor fields covering different regions of the face of the motion element respectively and are configured such that each of the at least two sensor fields includes,
an electrical resistance that changes as a function of the contact force acting on the force measurement film in the region of the respective sensor field, and
at least one measurement signal of the respective sensor field is based on the electrical resistance of the respective sensor field.

11. The motion robot of claim 10, wherein
the top tier includes a transparent protective film,
the protective film is back-printed, or
a non-transparent decorative film is arranged on an inner side of the protective film.

12. The motion robot of claim 11, wherein
the top tier includes a crumpled tier.

13. The motion robot of claim 1, wherein
the sensor tier includes at least two sensor fields, the at least two sensor fields covering different regions of the face of the motion element respectively and are configured such that each of the at least two sensor fields includes,
an electrical resistance that changes as a function of the contact force acting on the force measurement film in the region of the respective sensor field, and
at least one measurement signal of the respective sensor field is based on the electrical resistance of the respective sensor field.

14. The motion robot of claim 1, wherein
the top tier includes an at least transparent protective film,
the protective film is back-printed, or
a non-transparent decorative film is arranged on an inner side of the protective film.

15. The motion robot of claim 1, wherein
the top tier includes a crumpled tier.

16. A computer-implemented method for controlling a motion robot, the method comprising:
tapping an at least one measurement signal from a force measurement film; and
controlling a motion element based on the at least one measurement signal;
wherein the motion robot comprises:
at least one motion element; and
a force measurement film attached to a face of the motion element, the force measurement film configured to detect a contact force acting on the motion element, wherein the force measurement film includes:
a top tier to absorb the contact force,
an attachment tier attached to the face of the motion element, and
a sensor tier, the sensor tier including an electrical resistance that changes as a function of the contact force acting on the force measurement film, the sensor tier configured to provide at least one measurement signal based on the electrical resistance.

17. A flexible force measurement film for detecting a contact force acting on the flexible force measurement film, the flexible force measurement film comprising:
a top tier to absorb the contact force;
an attachment tier; and
a sensor tier including an electrical resistance of the sensor tier that changes as a function of the contact force acting on the flexible force measurement film, the sensor tier configured to provide at least one measurement signal based on the electrical resistance can be tapped.

18. The flexible force measurement film of claim 17, wherein
the flexible force measurement film has at least one incision emanating from an edge of the flexible force measurement film.

19. The flexible force measurement film of claim 18, wherein
the flexible force measurement film is cut-in by the incision in a region between two sensor fields.

20. The flexible force measurement film of claim 17, wherein
the flexible force measurement film has at least two sensor fields, the at least two sensor fields covering different regions of a face of the flexible force measurement film respectively, the at least two sensor fields are configured such that independent measurement signals respectively are provided, each of the independent measurement signals are proportional to the contact force acting on the respective sensor field.

* * * * *